US00RE37054E

(19) United States
(12) Reissued Patent
Sherwood

(10) Patent Number: US RE37,054 E
(45) Date of Reissued Patent: Feb. 20, 2001

(54) SECONDARY LOOP REFRIGERATION SYSTEM

(75) Inventor: Gregory J. Sherwood, North Oaks, MN (US)

(73) Assignee: Minnesota Mining and Manufacturing Company, St. Paul, MN (US)

(21) Appl. No.: 09/267,033

(22) Filed: Mar. 11, 1999

Related U.S. Patent Documents

Reissue of:
(64) Patent No.: 5,819,549
Issued: Oct. 13, 1998
Appl. No.: 08/941,688
Filed: Oct. 1, 1997

U.S. Applications:
(

(63) Continuation of application No. 08/731,539, filed on Oct. 16, 1996, now Pat. No. 5,713,211.

(51) Int. Cl.[7] ..... A47F 3/04
(52) U.S. Cl. ..... 62/246; 62/435
(58) Field of Search ..... 62/114, 246, 430, 62/434, 435; 252/67

(56) References Cited

U.S. PATENT DOCUMENTS

| | | | |
|---|---|---|---|
| 3,975,448 | 8/1976 | Delaunois et al. | 252/54 |
| 3,977,378 | 8/1976 | Harned | 123/122 AC |
| 4,883,116 | 11/1989 | Seidenberg et al. | 165/104.26 |
| 4,961,321 | 10/1990 | O'Neill et al. | 62/114 |
| 5,042,262 | 8/1991 | Gyger et al. | 62/64 |
| 5,318,106 * | 6/1994 | Dorini et al. | 165/40 |
| 5,410,095 | 4/1995 | Resnick et al. | 568/683 |
| 5,552,074 * | 9/1996 | Patron et al. | 252/67 |
| 5,713,211 | 2/1998 | Sherwood | 62/114 |
| 5,819,549 | 10/1998 | Sherwood | 62/246 |

FOREIGN PATENT DOCUMENTS

| | | |
|---|---|---|
| 882 844 | 7/1953 | (DE) . |
| 0 510 295 A2 | 10/1992 | (EP) . |
| 0 574 897 A1 | 12/1993 | (EP) . |
| 0 612 825 A1 | 8/1994 | (EP) . |
| 0 641 849 | 3/1995 | (EP) . |
| 2 198 917 | 4/1974 | (FR) . |
| 1193122 | 5/1970 | (GB) . |
| 1 435 942 | 5/1976 | (GB) . |
| 2 274 462 | 7/1994 | (GB) . |
| 2 274 463 | 7/1994 | (GB) . |
| 63-12504 | 3/1988 | (JP) . |
| 4-110386 | 4/1992 | (JP) . |
| 5-4596 | 1/1993 | (JP) . |
| 6-25803 | 1/1995 | (JP) . |
| 08259930 | 10/1996 | (JP) . |
| WO 93/14173 | 7/1993 | (WO) . |
| WO 94/02564 | 2/1994 | (WO) . |
| WO 97/14762 | 4/1997 | (WO) . |

OTHER PUBLICATIONS

E. Granryd, A. Melinder, "Secondary Refrigerants for Indirect Refrigeration and Heat Pump Systems," ScanRef 14–20 (Apr. 1994).

Slides from Winter Flourine Conference, Orlando, Florida, Jan. 22–27, 1995.

Elliott, A.J., "Fluoroethers and Fluoroamines," *Kirk–Othmer Encyclopedia of Chemical Technology,* vol. 11, Fourth Edition, pp. 525–533.

"Refrigeration," *Kirk–Othermer Encyclopedia of Chemical Technology,* vol. 20, Third Edition, pp. 91–94.

*Awards Digest,* Nasa Case No. GSC 13, 199–1.

Melinder, Åke, "Thermodynamic Properties For Secondary Refrigerants," Department of Energy Technology, Stockholm 1993.

*ASHRAE Handbook & Product Directory 1976 Systems,* "System Practices For Secondary Refrigerants (Brines)," Chapter 28, pp. 28.1–28.6.

*ASHRAE Handbook & Product Directory 1977 Fundamentals,* "Part II: Compression Refrigeration Cycles," Chapter 1, pp. 1.6–1.17.

Misaki, S. and Sekiya, Akira, "Development of a New Refrigerant," The 1995 International CFC and Halon Alternatives Conference, Oct. 23–25, 1995.

Science Et Technique Du Froid, 1994, pp. 485–491, Sako et al., "Thermodynamic Properties of Fluorinated Ethers As Alternative Refrigerants".

* cited by examiner

*Primary Examiner*—William E. Tapolcai
(74) *Attorney, Agent, or Firm*—Lisa M. Fagan

(57) ABSTRACT

A method and apparatus are provided for using certain hydrofluoroethers (HFEs) as low temperature heat transfer media in secondary loop refrigeration systems. These materials exhibit a low, somewhat linear Temperature Difference Factor over the temperature range of −15° C. to −65° C., making them ideal for use as low temperature heat transfer media. The HFEs of the present invention are nonflammable, nontoxic, environmentally benign, and have a high heat transfer capacity and low viscosity over the required operating temperatures. Furthermore, since these materials have high boiling points and low freezing points, they are not prone to phase changes over the required operating temperatures, and do not require pressurized systems.

21 Claims, 10 Drawing Sheets

SECONDARY LOOP REFRIGERATION SYSTEM

Matter enclosed in heavy brackets [ ] appears in the original patent but forms no part of this reissue specification; matter printed in italics indicates the additions made by reissue.

CROSS-REFERENCE TO RELATED APPLICATION

This is a Continuation of U.S. patent application Ser. No. 08/731,539, filed Oct. 16, 1996, now U.S. Pat. No. 5,713, 211.

FIELD OF THE INVENTION

The present invention relates to heat transfer media, and in particular to the use of hydrofluoroethers (HFEs) as low temperature heat transfer media.

BACKGROUND OF THE INVENTION

Various materials are known to the art which can be used as heat transfer media in refrigeration systems. These materials include water, aqueous brines, alcohols, glycols, ammonia, hydrocarbons, ethers, and various halogen derivatives of these materials. While many of these materials are effective as heat transfer media under certain conditions, practical considerations eliminate many of them from use in key commercial settings, such as in refrigeration systems in grocery stores. In these applications, only a fraction of the class of known heat transfer agents are of commercial significance.

One factor that eliminates many heat transfer media from consideration is their environmental impact. Many known heat transfer media are being phased out because of their environmental persistence, or because they have been implicated in depletion of the ozone layer. An example of the former are the perfluoroalkanes, whose chemical inertness prevents them from being degraded by the natural processes that cleanse the atmosphere. As a result, perfluoroalkanes can have atmospheric half lives of several decades. An example of the latter are the chlorofluorocarbons, which are currently being banned in most countries. See, e.g., P. S. Zurer, "Looming Ban on Production of CFCs, Halons Spurs Switch to Substitutes." Chemical & Engineering News, page 12, Nov. 15, 1993.

Another factor that removes many heat transfer agents from consideration is their toxicity. This is the case, for example, with ammonia and with many of the ethylene glycols. The toxicity of these materials, by ingestion, inhalation, or transdermal absorption, makes them dangerous to handle and unsuitable for commercial food handling environments.

Still other heat transfer agents are disfavored because of their flammability. This is the case, for example, with most ethers and hydrocarbons. The risk of flammability is particularly great where the heat transfer agent is subject to large positive pressures within the refrigeration cycle.

Other heat transfer agents are disfavored because they are gases at normal operating temperatures. An example of this type of refrigerant is ammonia. Gaseous heat transfer media require special high pressure equipment, such as pressure regulators and reinforced tubing, that are not required for refrigerants that remain in a liquid state through most or all of the operating cycle. Furthermore, high pressure systems are prone to leakage. Thus, it has been estimated that annual refrigerant losses to the atmosphere from high pressure systems fall within the range of 10 to 20% of the full charge per year.

Still other heat transfer media are not preferred because of their corrosive nature. Many of the aqueous brines fall into this category. Like gaseous media, corrosive agents require special handling provisions, such as Teflon®-lined conduits and interfaces, which add significantly to the overall cost of the system. Furthermore, restrictions on the selection of materials usable with corrosive agents decreases the overall efficiency of these systems.

Recently, a new type of refrigeration system has emerged that has placed even greater demands on the already narrow class of commercially viable refrigerants. This type of system, known as a secondary loop refrigeration system, has many advantages over conventional refrigeration systems, one of the most important being a significant improvement in energy efficiency. Currently, 20% of the refrigerants sold in the United States are installed in conventional high pressure supermarket systems. These systems consume about 4% of the electrical energy output in the United States each year (see Hrnjak, EPA grant application AEERL 5-22, Mar. 25, 1995). Hence, the total energy savings offered by secondary loop refrigeration systems in the supermarket sector alone is enormous.

In addition to being more energy efficient, secondary loop systems are also more compact in design, can be factory built, and are capable of operating with an extremely small charge of refrigerant. Furthermore, in secondary loop systems, the vapor compression process of the refrigeration cycle is centralized, and can be operated from a remote location. Thus, the compressor in a secondary loop system can be placed on a roof top, in a ventilated machine room, or in any other convenient location where it will not occupy valuable floor space or contribute to background noise, and where the effects of refrigerant leakage are minimized. Also, since the primary running through the compressor is segregated from the secondary loop used to cool the goods being refrigerated, the primary loop may utilize ammonia and other high efficiency refrigerants that are unsuitable for use as direct refrigerants in many applications.

While secondary loop systems have many clear advantages over conventional refrigeration systems, for commercial use of secondary loop systems has been limited by the unavailability of suitable secondary refrigerants. For a secondary loop system to function most efficiently, the heat transfer media within the secondary loop must be cooled to a low temperature, typically at least −15° C., and more preferably lower than about −25° C. While refrigeration systems are known that cool to temperatures of −30° to −40° C., such systems typically require the use of high pressure refrigerants to achieve these temperatures. The disadvantages of high pressure systems have already been noted.

Unfortunately, absent a high positive pressure, most refrigerants that perform suitably at normal temperatures no longer perform well at the low temperatures required by secondary loop systems. See, e.g., E. Granryd, A. Melinder, "Secondary Refrigerants for Indirect Refrigeration and Heat Pump Systems", ScanRef 14–20 (April 1994), which considers a variety of secondary refrigerants, but concludes that it is difficult to nominate good candidates for low temperature applications. At low temperatures, the viscosities of many refrigerants increase to the point where a large amount of energy is required to circulate the refrigerant through the secondary cooling loop. Propylene glycol exhibits this phenomenon. Other refrigerants, such as silicone oils and hydrocarbon based fluids, have a poor heat transfer capacity at low temperatures. As a result, systems utilizing these refrigerants suffer a marked decrease in energy efficiency at lower temperatures. Often, the drop off in performance of refrigerants at lower temperatures is precipitous. Thus, the efficiency with which Tyfoxit® 1.15 transfers heat decreases by more than 15% between −10° C. and −15° C. When one considers that many conventional refrigerants undergo phase changes at temperatures above about −20° C., the choices of heat transfer media for secondary loop systems are few indeed.

There thus remains a need in the art for a heat transfer medium that is suitable for low temperature applications, and for secondary loop refrigeration systems in particular, and which is nontoxic, nonflammable, environmentally friendly, and does not require the use of a high positive pressure. These and other needs are answered by the present invention, as hereinafter disclosed.

SUMMARY OF THE INVENTION

The present invention provides a method and apparatus for using certain hydrofluoroethers (HFEs) as low temperature heat transfer media in secondary loop refrigeration systems. Surprisingly, these materials exhibit a low, somewhat linear Temperature Difference Factor over the temperature range of −15° C. to −65° C., making them ideal for use as low temperature heat transfer media. The HFEs of the present invention are nonflammable, nontoxic environmentally benign, and have a high heat transfer capacity and low viscosity over the required operating temperatures. Furthermore, since these materials have high boiling points and low freezing points, they are not prone to phase changes over the required operating temperatures, and do not require pressurized systems.

DETAILED DESCRIPTION OF THE PREFERRED EMBODIMENTS

As used herein, the term "secondary loop refrigeration system" refers to a system in which a heat transfer medium is used to transport energy from a heat source to a primary refrigeration system.

The term "secondary loop" refers to the path over which the heat transfer medium travels while it is being cycled between the heat source and the primary refrigeration system.

The term "secondary refrigerant" refers to the heat transfer medium in the secondary loop.

The term "primary refrigeration system" refers to that portion of a secondary loop refrigeration system where heat is transferred to the external environment by way of a compressor.

The term "primary refrigerant" refers to the heat transfer medium used in the primary refrigeration system.

Figure 1:
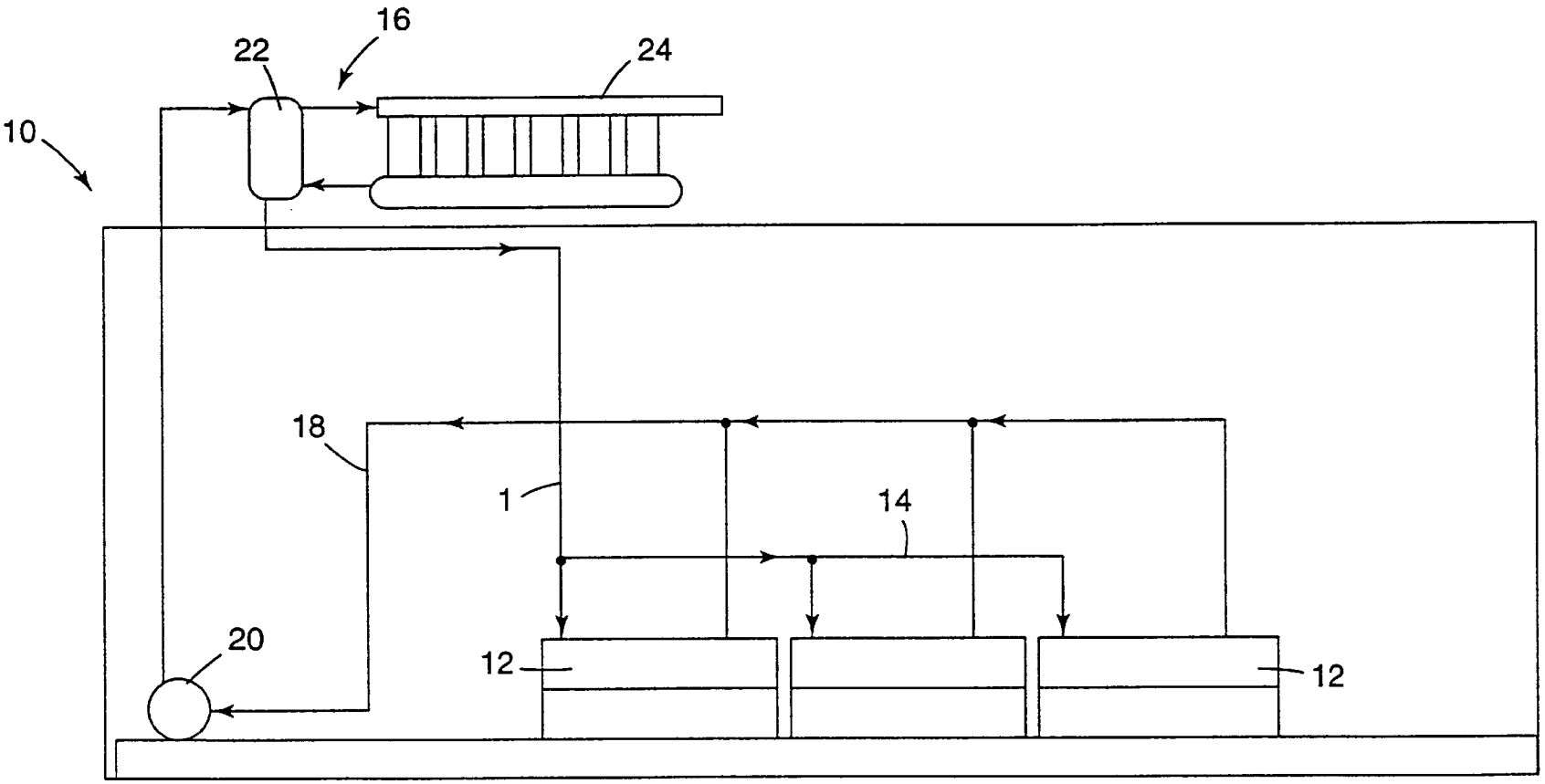
FIG. 1 is a schematic drawing of a secondary loop refrigeration system suitable for installation in a supermarket.

FIG. 1 illustrates the configuration of a typical secondary loop refrigeration system 10 suitable for installation in a grocery store. The goods to be refrigerated are arranged in a series of display cases 12 located throughout the store. Each display case is fitted with one or more refrigeration coils that are in open communication with a network of liquid feedlines 14 which convey the secondary refrigerant from the primary refrigeration system 16 to the display cases.

In operation, energy enters the display cases in the form of ambient heat, and is transferred to the secondary refrigerant by way of the refrigeration coils. The transfer of heat to the secondary refrigerant is typically facilitated by the use of fans, which circulate air around the goods in the display case and over the surfaces of the refrigeration coils. The warmed secondary refrigerant is then withdrawn from the display cases through the liquid return lines 18 by means of a circulation pump 20 and is fed into a primary-to-secondary heat exchanger 22, where the heat from the warmed secondary cooling medium is transferred to the primary refrigerant. The cooled secondary medium is then returned to the display cases by means of the liquid feed lines.

The warmed primary refrigerant is circulated through a roof top compressor 24. In the compressor, heat is extracted from the primary refrigerant and expelled to the environment. In the process, the primary refrigerant is liquefied and cooled. The primary refrigerant is then expanded and returned to the primary-to-secondary heat exchanger.

To date, several criteria have been used in the art for selecting refrigerants for particular applications. However, for the purposes of the present invention, it was desirable to find a single factor that would summarize the overall performance of a refrigerant as a function of temperature, and that could be used to compare the performance of any two refrigerants independent of system specific variables. In order to accurately reflect the performance of a heat transfer medium in a secondary loop refrigeration system, such a factor would have to take into account the energy required to pump the medium through the secondary loop as temperature decreases, and the ability of the medium to transfer heat at lower temperatures.

The factor selected for this purpose is the Temperature Difference Factor ($F_\theta$), which has been described by Granryd and Melinder, SCANREF International, pp. 15–20 (April 1994). The Temperature Difference Factor describes the performance of a fluid over a broad temperature range by characterizing the temperature difference on the fluid flow side of a heat exchanger under turbulent flow conditions, at a given heat flux, q, and at a given specific pumping power, E/Q. The Temperature Difference Factor can be determined from four system independent transport variables: density, thermal conductivity, specific heat, and kinematic viscosity. Consequently, the Temperature Difference Factor allows for direct comparison of performance for both aqueous and non-aqueous secondary cooling fluids over their entire operating ranges by showing the temperature rise of a given fluid as it passes through a heat exchanger under predetermined conditions of heat flux, load, pump power, pump efficiency and tube diameter. In evaluating heat transfer fluids, a low value of $F_\partial$ indicates a low temperature rise, and therefore high heat transfer efficiency.

The Temperature Difference Factor ($F_\partial$) is calculated from the equation $$\partial = F_\partial \times (q^{5/7} \cdot d^{1/7})/(4\eta_p \cdot E_p/Q)^{2/7} \quad \text{(Equation 1)}$$

where q is the heat flux, d is the diameter of the tube, $\eta_p$ is the pump efficiency, $E_p$ is the pump power, Q is the load and $\partial$ is the temperature difference between the fluids in the heat exchanger. The equation can be solved for pump power, $E_p$, and the ratio of pump powers for any two fluids can be determined. This ratio provides a comparative factor for the relative pump power requirements of two different fluids under a given set of fixed conditions of heat flux, load and tube diameter, and is given by the equation $$E_{1p}/E_{2p} = (F_{1\partial})^{7/2}/(F_{2\partial})^{7/2} \quad \text{(Equation 2)}$$

For example, a first fluid having $F_{1\partial}=0.006$ and a second fluid having a $F_{2\partial}=0.004$ $Kg^{2/7}$ $m^2S^{1/3}/J$ would have a pump power ratio of 4.1. This demonstrates that the power required to pump the first fluid is 4.1 times greater than the second fluid.

Equation 1 may be simplified to $$F_\partial = (F_p^{2/7})/F\alpha \quad \text{(Equation 3)}$$

where $F_p$ is the Pressure Drop Factor and $F_\alpha$ is the Heat Transfer Factor. The Pressure Drop Factor is an estimate of the pressure drop, or loss due to friction, as a fluid flows through a tube. As such, it is a function of both fluid properties and system properties. This factor separates fluid-dependent variables from system-dependent variables and, when plotted as a function of temperature, allows different fluids to be compared, independent of system specific variables. The Pressure Drop Factor is calculated by the equation $$F_p = 0.092 \cdot \rho \cdot \nu^{0.2} \quad \text{(Equation 4)}$$

where $\rho$ is density of the fluid and $\nu$ is the kinematic viscosity of the fluid at a specified temperature.

The Heat Transfer Factor is proportional to the heat transfer of a fluid under turbulent flow conditions. Heat transfer is a function of both fluid properties and the geometry of the heat transfer surface. As with the Pressure Drop Factor, the fluid-dependent variables may be separated from the system-dependent variables and the former may be plotted as a function of temperature. The Heat Transfer Factor ($F_\alpha$) may be calculated by the equation $$F_\alpha = 0.023 \cdot \lambda^{(2/3)} \cdot (\rho \cdot c_p)^{1/3} \cdot \nu^{-1/2} \quad \text{(Equation 5)}$$

where $\lambda$ is the thermal conductivity, $\rho$ is the density, $c_p$ is the specific heat, and $\nu$ is the kinematic viscosity.

The heat transfer media useful in the present invention comprise fluorinated ethers of the formula $$R_1—O—R_2 \quad \text{(Formula I)}$$

where $R_1$ and $R_2$ are the same or different and are selected from the group consisting of substituted and nonsubstituted alkyl, aryl, and alkylaryl groups and their derivatives. At least one of $R_1$ and $R_2$ contains at least one fluorine atom, and at least one of $R_1$ and $R_2$ contains at least one hydrogen atom. Optionally, one or both of $R_1$ and $R_2$ may contain one or more caternary or noncaternary heteroatoms, such as nitrogen, oxygen, or sulfur, and/or one or more halogen atoms, including chlorine, bromine, or iodine. $R_1$ and $R_2$ may also optionally contain one or more functional groups, including carbonyl, carboxyl, thio, amino, amide, ester, ether, hydroxy, and mercaptan groups. $R_1$ and $R_2$ may also be linear, branched, or cyclic alkyl groups, and may contain one or more unsaturated carbon-carbon bonds.

Preferably, the heat transfer media of the present invention comprise fluorinated ethers of the formula $$R_f—O—R \quad \text{(Formula II)}$$

where $R_f$ and R are defined as above for $R_1$ and $R_2$, except that $R_f$ contains at least one fluorine atom, and R contains no fluorine atoms. More preferably, R is a noncyclic branched or straight chain alkyl group, such as methyl, ethyl, n-propyl, iso-propyl, n-butyl, iso-butyl, or t-butyl, and $R_f$ is a fluorinated derivative of such a group.

In the most preferred embodiment, $R_1$ and $R_2$ or $R_f$ and R are chosen so that the compound has at least three carbon atoms, and the total number of hydrogen atoms in the compounds is at most equal to the number of fluorine atoms. Compounds of this type tend to be nonflammable. Specific examples of preferred heat transfer media for use in the present invention include $C_3F_7OCH_3$, $C_3F_7OC_2H_5$, $C_4F_9OCH_3$, and $C_4F_9OC_2H_5$.

The heat transfer media of the present invention may be used alone or in conjunction with one or more other heat transfer media of the invention or with one or more other heat transfer media as are known to the art. The heat transfer media of the present invention may be used as a pure compound, or as a blend, solution, or mixture (azeotropic or otherwise) with one or more other materials. Such other materials may include other heat transfer media, either of the present invention or as are known to the art, or one or more substances used to induce a freezing point depression or boiling point elevation.

Examples 1–4 illustrate the improved performance characteristics of the heat transfer media of the present invention, compared to prior art heat transfer media.

EXAMPLE 1

The thermal conductivities of $C_4F_9OC_2H_5$, $C_4F_9OCH_3$, $C_3F_7OCH_3$, and $C_6F_{14}$ were determined using a transient, hot-wire thermal conductivity cell over the temperature range of −50° C. to +50° C., according to ASTM D 2717-86. A platinum wire was used in the measurements. The wire was 20 cm in length, 0.17 mm in diameter, and had a resistance of 120Ω at 20° C. The thermal conductivities are set forth in Tables 1–4.

EXAMPLE 2

The densities of the fluids of Example 1 were determined from 0° C. to +50° C. using a using a Mettler-Parr Model DMA45 densitometer. For temperatures below 0° C., densities were determined by extrapolation of the measured densities with a linear curve fit. The densities are set forth in Tables 1–4.

EXAMPLE 3

The kinematic viscosity of the fluids of Example 1 were measured according to ASTM D 4486-85 over the temperature range of −60° C. to 25° C. The results were curve fit to five data points. The resulting kinematic viscosities are set forth in Tables 1–4.

EXAMPLE 4

The specific heats of the fluids of Example 1 were measured by differential scanning calorimetry according to ASTM E 1269-90 over a temperature range of −30° to 58° C. For temperatures below −30° C., specific heats were determined by extrapolation of the measured specific heats with a linear curve fit. The specific heats are shown in Tables 1–4.

TABLE 1

Fluid Property Data for $C_4H_9OC_2H_5$

| Temperature (° C.) | Specific Heat (J/Kg ° C.) | Density (Kg/m$^3$) | Thermal Conductivity (Watt/m ° C.) | Kinematic Viscosity (m$^2$/sec × $10^{-7}$) |
|---|---|---|---|---|
| −60 | 1053 | 1601 | .0850 | 18.1 |
| −55 | 1063 | 1590 | .0838 | 15.6 |
| −50 | 1073 | 1579 | .0827 | 13.6 |
| −45 | 1083 | 1568 | .0816 | 11.9 |
| −40 | 1093 | 1557 | .0805 | 10.7 |
| −35 | 1103 | 1546 | .0795 | 9.6 |
| −30 | 1113 | 1535 | .0784 | 8.8 |
| −25 | 1123 | 1524 | .0774 | 8.2 |
| −20 | 1133 | 1513 | .0764 | 7.6 |
| −15 | 1143 | 1502 | .0754 | 7.2 |
| −10 | 1153 | 1491 | .0745 | 6.8 |
| −5 | 1163 | 1480 | .0735 | 6.4 |
| 0 | 1173 | 1469 | .0726 | 6.0 |
| 5 | 1183 | 1458 | .0718 | 5.6 |
| 10 | 1193 | 1447 | .0709 | 5.2 |
| 15 | 1203 | 1436 | .0700 | 4.7 |
| 20 | 1213 | 1425 | .0692 | 4.3 |
| 25 | 1223 | 1414 | .0684 | 3.9 |
| 30 | 1233 | 1403 | .0676 | 3.5 |
| 35 | 1243 | 1392 | .0669 | 3.2 |
| 40 | 1253 | 1381 | .0661 | 2.9 |
| 45 | 1263 | 1370 | .0654 | 2.9 |

TABLE 2

Fluid Property Data for $C_4F_9OCH_3$

| Temperature (° C.) | Specific Heat (J/Kg ° C.) | Density (Kg/m$^3$) | Thermal Conductivity (Watt/m ° C.) | Kinematic Viscosity (m$^2$/sec × $10^{-7}$) |
|---|---|---|---|---|
| −60 | 1013 | 1672 | .085 | 18.1 |
| −55 | 1023 | 1661 | .084 | 15.6 |
| −50 | 1033 | 1650 | .083 | 13.6 |
| −45 | 1043 | 1639 | .083 | 11.9 |
| −40 | 1053 | 1629 | .082 | 10.7 |
| −35 | 1063 | 1618 | .081 | 9.6 |
| −30 | 1073 | 1607 | .080 | 8.8 |
| −25 | 1083 | 1597 | .079 | 8.2 |
| −20 | 1093 | 1586 | .078 | 7.6 |
| −15 | 1103 | 1575 | .077 | 7.2 |
| −10 | 1113 | 1564 | .076 | 6.8 |
| −5 | 1123 | 1554 | .075 | 6.4 |
| 0 | 1133 | 1543 | .074 | 6.0 |
| 5 | 1143 | 1532 | .073 | 5.6 |
| 10 | 1153 | 1522 | .072 | 5.2 |
| 15 | 1163 | 1511 | .071 | 4.7 |
| 20 | 1173 | 1500 | .070 | 4.3 |
| 25 | 1183 | 1489 | .069 | 3.9 |
| 30 | 1193 | 1479 | .068 | 3.5 |
| 35 | 1203 | 1468 | .067 | 3.2 |
| 40 | 1213 | 1457 | .066 | 2.9 |
| 45 | 1223 | 1447 | .065 | 2.9 |

TABLE 3

Fluid Property Data for $C_3F_7OCH_3$

| Temperature (° C.) | Specific Heat (J/Kg ° C.) | Density (Kg/m$^3$) | Thermal Conductivity (Watt/m ° C.) | Kinematic Viscosity (m$^2$/sec × $10^{-7}$) |
|---|---|---|---|---|
| −60 | 1013 | 1606 | .085 | 9.90 |
| −55 | 1023 | 1591 | .084 | 9.22 |
| −50 | 1033 | 1576 | .083 | 8.54 |
| −45 | 1043 | 1561 | .083 | 7.86 |
| −40 | 1053 | 1546 | .082 | 7.22 |
| −35 | 1063 | 1531 | .081 | 6.61 |
| −30 | 1073 | 1516 | .080 | 6.05 |
| −25 | 1083 | 1501 | .079 | 5.54 |
| −20 | 1093 | 1486 | .078 | 5.10 |
| −15 | 1103 | 1471 | .077 | 4.71 |
| −10 | 1113 | 1456 | .076 | 4.38 |
| −5 | 1123 | 1441 | .075 | 4.10 |
| 0 | 1133 | 1426 | .074 | 3.86 |
| 5 | 1143 | 1411 | .073 | 3.65 |
| 10 | 1153 | 1396 | .072 | 3.45 |
| 15 | 1163 | 1381 | .071 | 3.25 |
| 20 | 1173 | 1366 | .070 | 3.02 |
| 25 | 1183 | 1351 | .069 | 2.74 |
| 30 | 1193 | 1336 | .068 | 2.38 |
| 35 | 1203 | 1321 | .067 | 1.91 |
| 40 | 1213 | 1306 | .066 | 1.29 |
| 45 | 1223 | 1291 | .065 | |

TABLE 4

Fluid Property Data for $C_6F_{14}$ (Comparative)

| Temperature (° C.) | Specific Heat (J/Kg ° C.) | Density (Kg/m$^3$) | Thermal Conductivity (Watt/m ° C.) | Kinematic Viscosity (m$^2$/sec × $10^{-7}$) |
|---|---|---|---|---|
| −60 | 921 | 1897 | .070 | 20.50 |
| −55 | 928 | 1884 | .069 | 17.50 |
| −50 | 936 | 1871 | .068 | 15.10 |
| −45 | 944 | 1857 | .068 | 13.20 |
| −40 | 951 | 1844 | .067 | 11.70 |
| −35 | 960 | 1831 | .066 | 10.40 |
| −30 | 967 | 1818 | .066 | 9.32 |
| −25 | 975 | 1805 | .065 | 8.41 |
| −20 | 982 | 1792 | .064 | 7.64 |
| −15 | 991 | 1779 | .063 | 6.96 |
| −10 | 998 | 1766 | .063 | 6.38 |
| −5 | 1006 | 1753 | .062 | 5.87 |
| 0 | 1014 | 1740 | .061 | 5.42 |
| 5 | 1022 | 1727 | .061 | 5.03 |
| 10 | 1029 | 1714 | .060 | 4.67 |
| 15 | 1037 | 1701 | .059 | 4.36 |
| 20 | 1045 | 1688 | .059 | 4.08 |
| 25 | 1053 | 1675 | .058 | 3.83 |
| 30 | 1061 | 1662 | .057 | 3.60 |
| 35 | 1068 | 1649 | .057 | 3.40 |
| 40 | 1072 | 1636 | .056 | 3.22 |
| 45 | 1084 | 1623 | .055 | 3.05 |
| 50 | 1092 | 1610 | .055 | 2.90 |
| 55 | 1099 | 1596 | .054 | 2.77 |

EXAMPLE 5

The values of the Pressure Drop Factor, the Heat Transfer Factor and the Temperature Difference Factor were calculated using Equations 1, 3, 4 and 5 for the temperature range 20° C. to −60° C. for each of the compounds of Example 1, based on the data in Table 1–4. For the purposes of these calculations, the specific heats and thermal conductivities for the compound $C_3F_7OCH_3$ were assumed to be the same as for $C_4F_9OCH_3$. For comparison, corresponding data was collected for $C_6F_{14}$, and the Pressure Drop Factor, Heat Transfer Factor, and Temperature Difference Factor were determined for this compound as well. These results are plotted in FIGS. 2–4. For further comparison, the Pressure Drop Factor, Heat Transfer Factor, and Temperature Difference Factor for several conventional refrigerants, as obtained from Granryd and Melinder, supra, is also shown. The units for the Heat Transfer Factor are $J/(s^{1/3}m^{8/3}{}^{\circ}C.)$. The units for the Pressure Drop Factor are $Kg/(m^{13/5}S^{1/5})$. The units for the Temperature Difference Factor are $(Kg^{2/7}m^{2}\ s^{1/3})/J$ The above Examples, as summarized in FIGS. 2–4, illustrate the unexpected advantages of the heat transfer media of the present invention over other refrigerants in low temperature applications.

Figure 2:
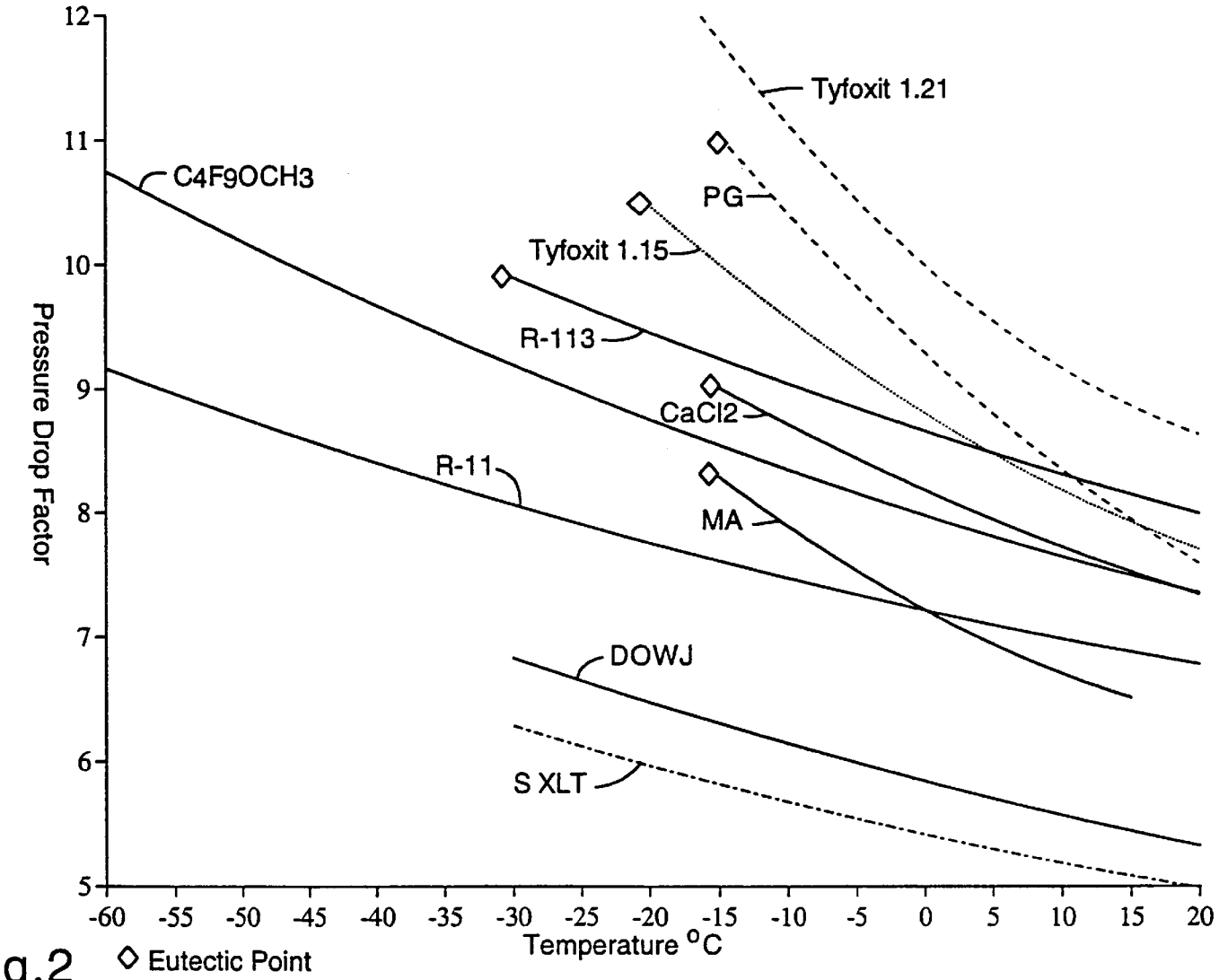
FIGS. 2 and 2a are graphs depicting the pressure drop factor as a function of temperature for some embodiments of the present invention as well as several prior art heat transfer fluids.
Figure 2A:
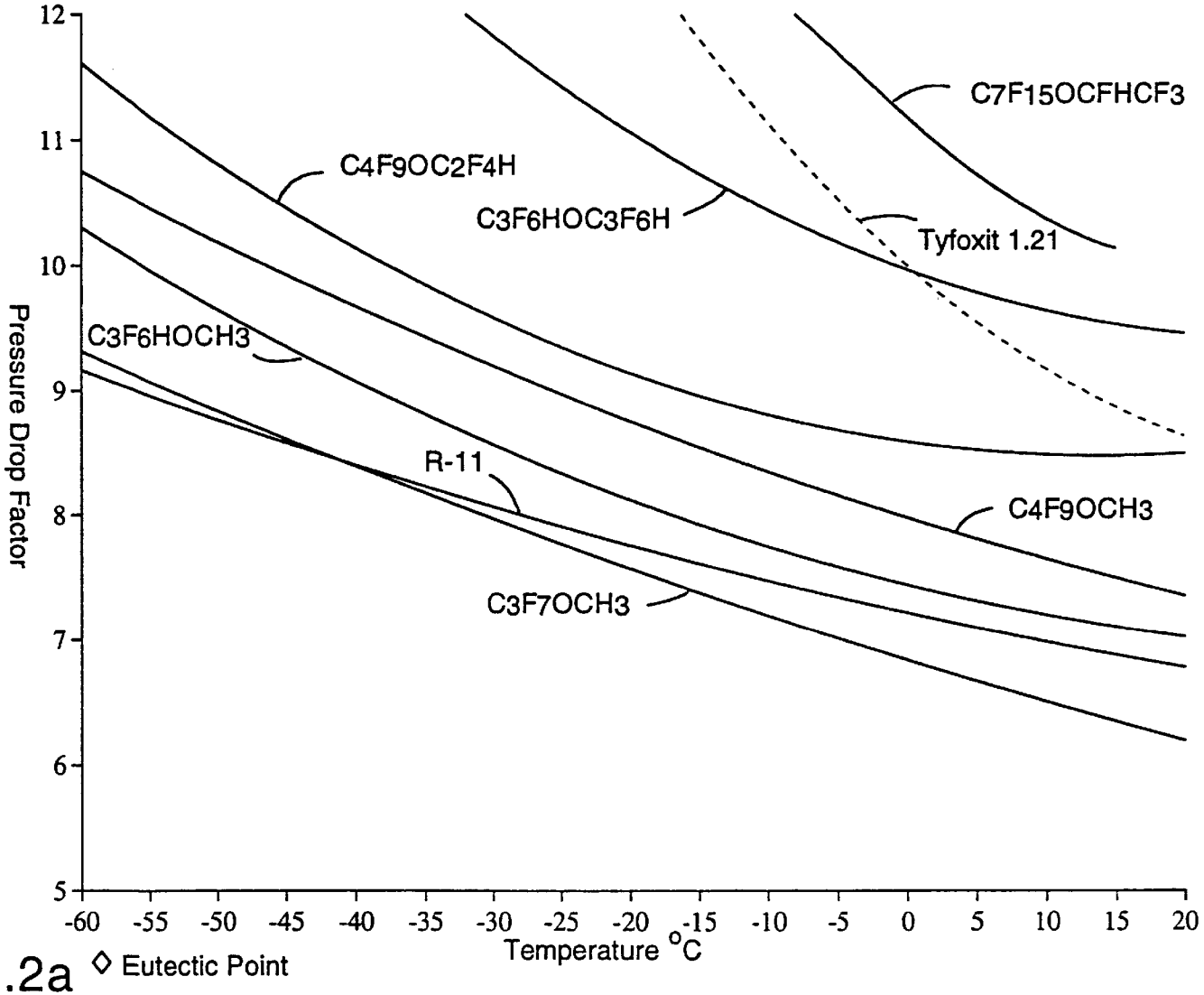

FIGS. 2 and 2a depict the Pressure Drop Factor as a function of temperature for several heat transfer media. The viscosity of a fluid has the greatest influence on the Pressure Drop Factor. A low viscosity indicates that the fluid enters turbulent flow sooner given the same fluid velocity. The frictional forces from the tube walls are translated into the fluid, forcing it to churn and mix. As the viscosity increases with reduced temperature, the frictional forces also increases, as does the Pressure Drop Factor.

The relative energy transfer losses that occur due to friction are readily apparent from FIGS. 2 and 2a. All of the aqueous solutions follows a nonlinear plot as the temperature drops. The fluids with the least pressure drop are the Dowtherm® (a mixture of alkylated aromatic isomers, available from Dow Corning Corp., Midland, Mich.) and Sylthern® (a silicone polymer available from Dow Corning Corp., Midland, Mich.) heat transfer fluids, primary due to their combined low viscosity and low density. Below −15° C., $C_4F_9OCH_3$ is surpassed only by these two fluids.

Figure 3:
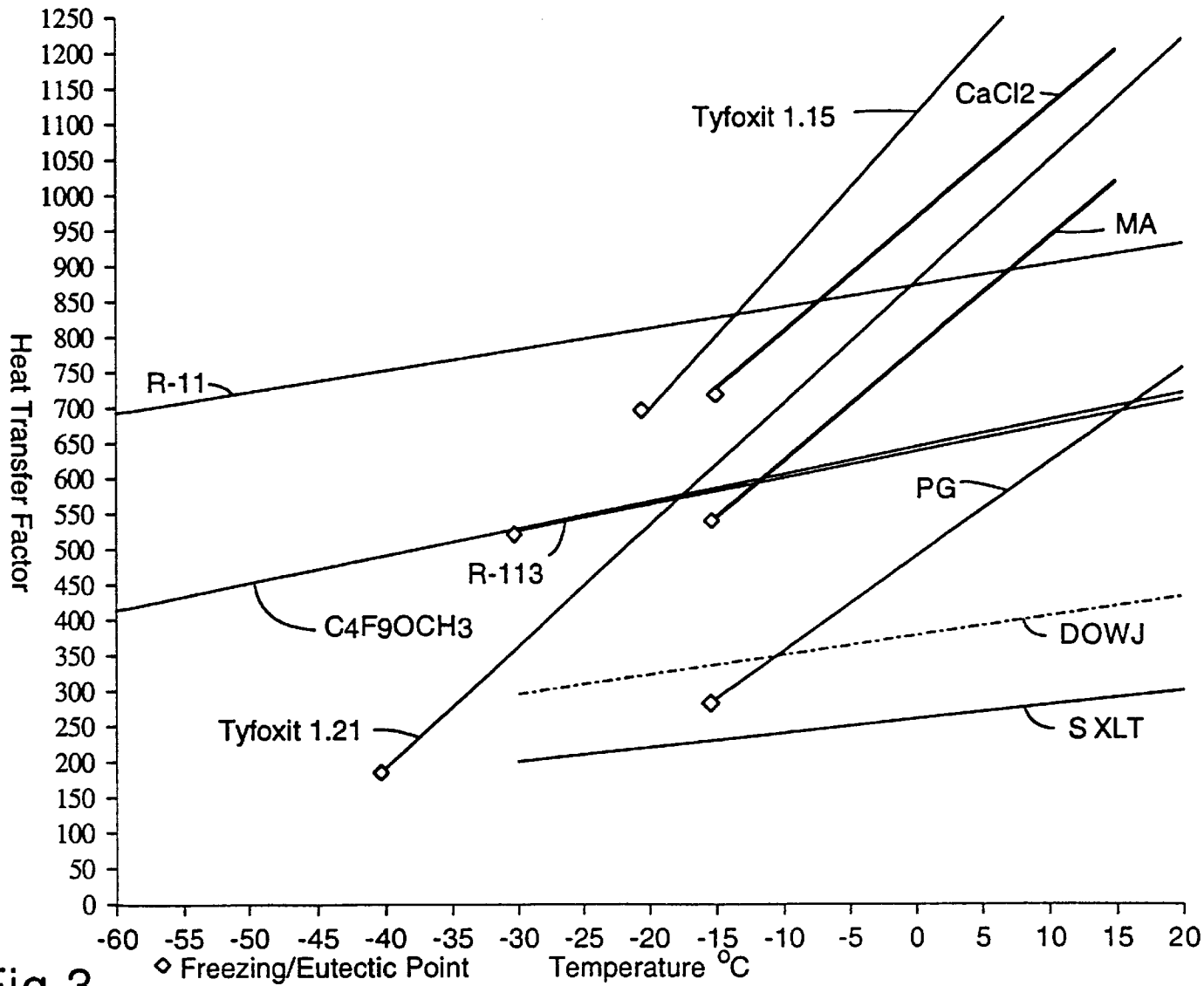
FIGS. 3 and 3a are graphs depicting the heat transfer factor as a function of temperature for some embodiments of the present invention as well as several prior art heat transfer fluids.
Figure 3A:
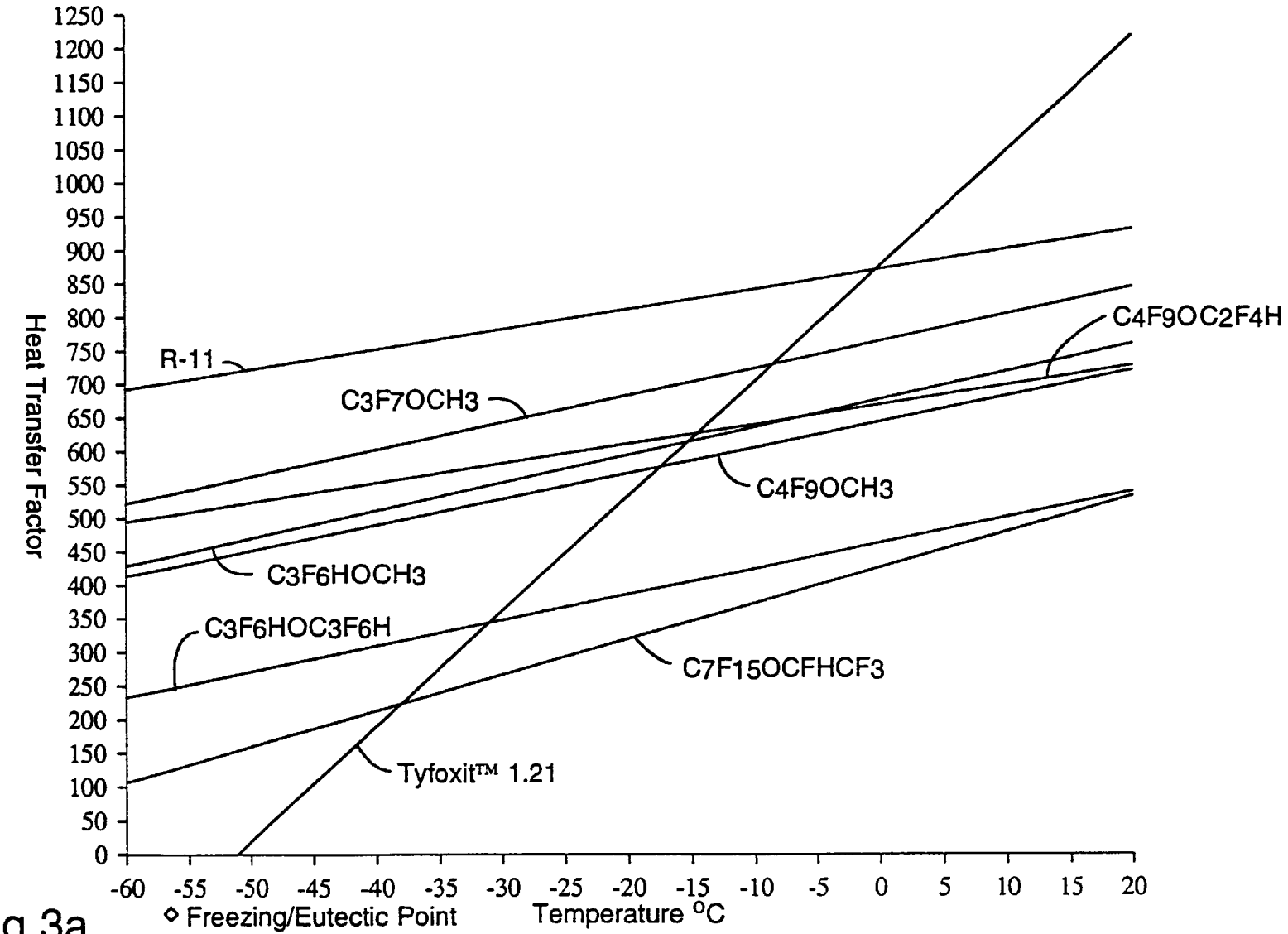
Figure 4:
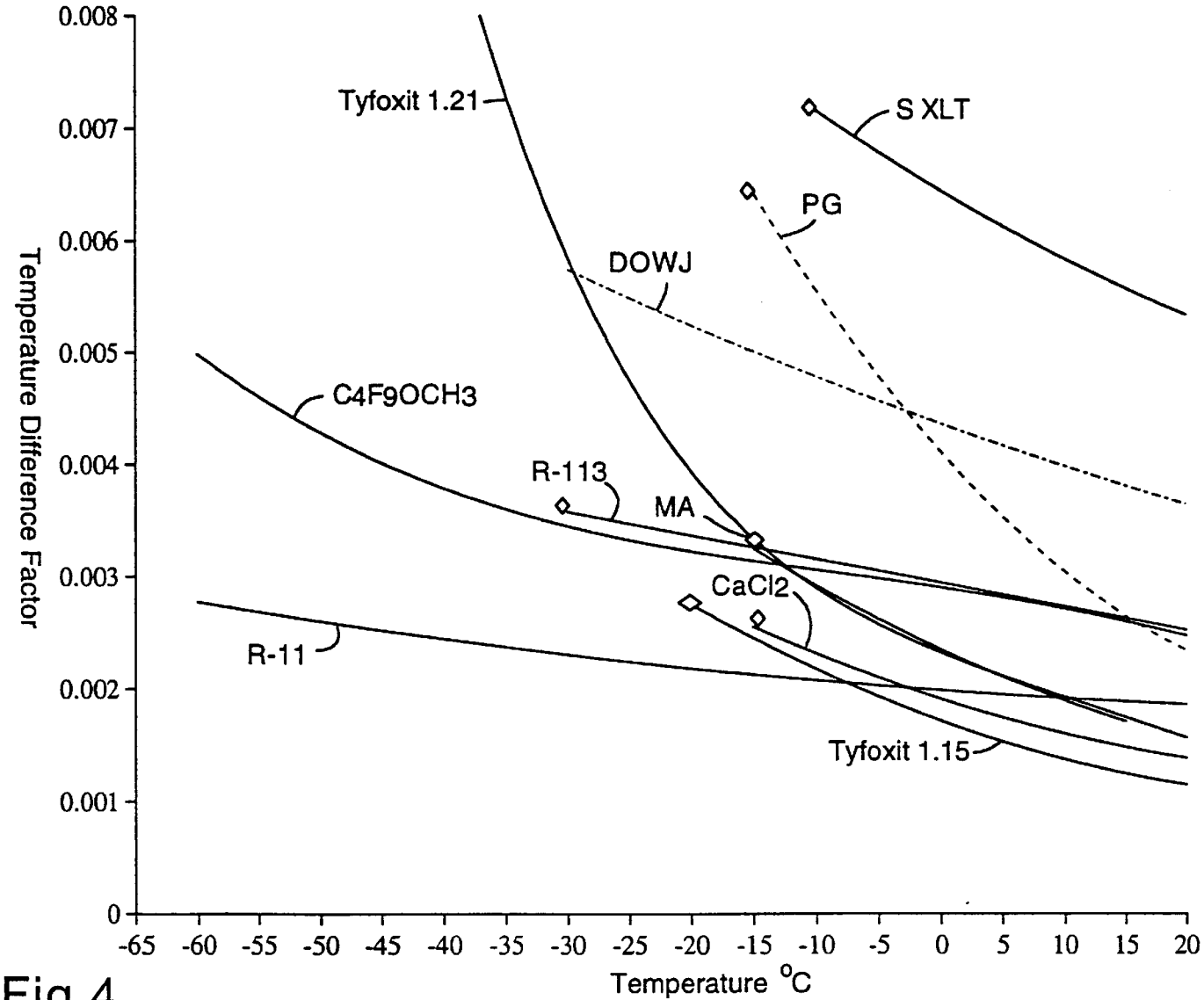
FIGS. 4 and 4a are graphs depicting the temperature difference factor as a function of temperature for some embodiments of the present invention as well as several prior art heat transfer fluids.
Figure 4A:
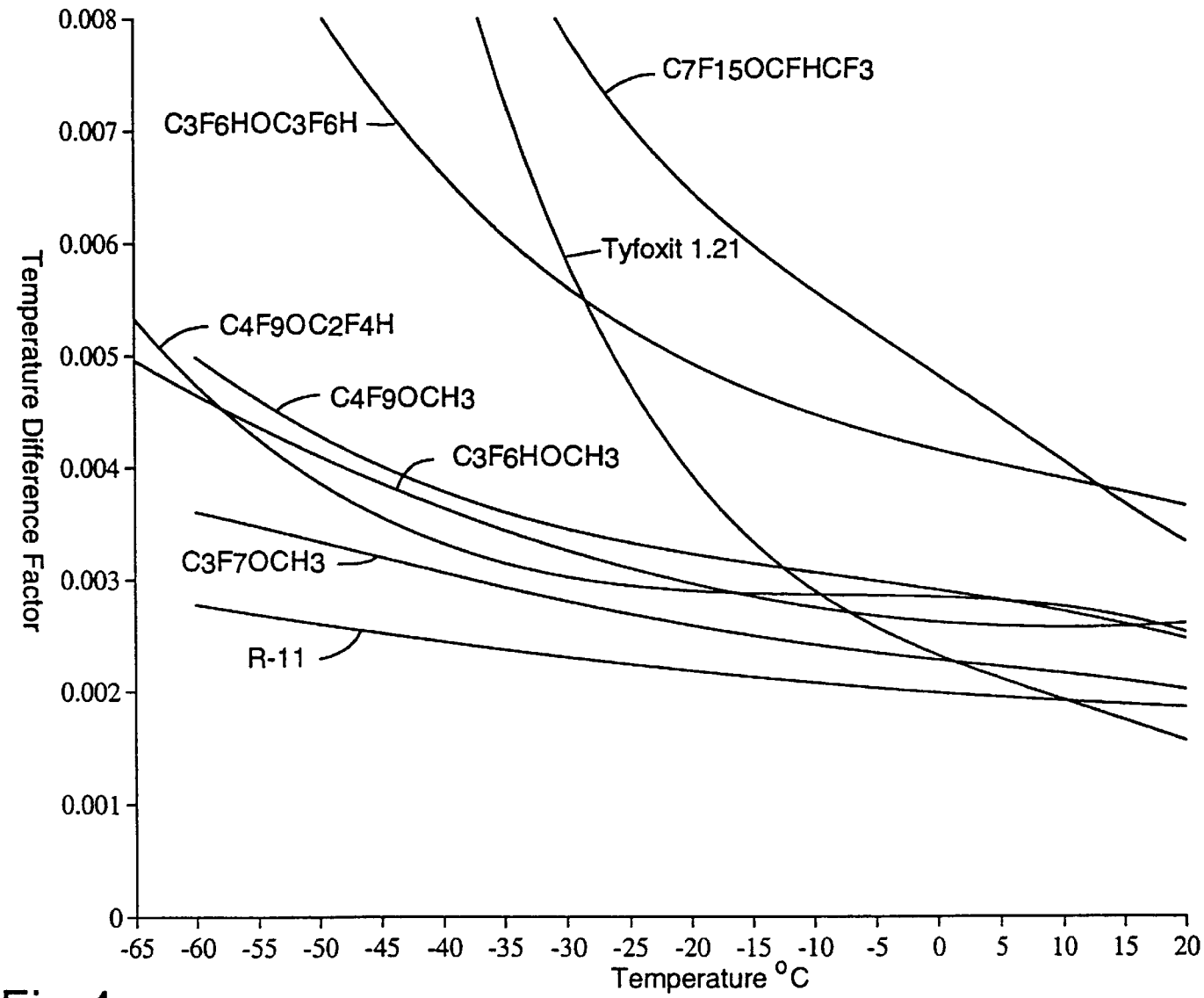

With reference to FIGS. 3 and 3a, the Heat Transfer Factor curves are essentially linear for all of the fluids of interest, although the slopes of these curves vary significantly. The aqueous solutions generally follow the same slope, but are shifted along the ordinate by the different freezing point depressants added to the water. Relative to the non-aqueous fluids, the slopes of the curves for the aqueous solutions are quite steep, and indicates that their ability to transfer heat drops off rapidly as the operating temperatures of secondary systems is approached. Below −20° C., $C_4F_9OCH_3$ holds the highest value of the Heat Transfer Factor.

The value of the Pressure Drop Factor is generally less significant than the value of the Temperature Difference Factor. As noted in Equation 3, the Pressure Drop Factor is required to calculate the Temperature Difference Factor, but its value is reduced by raising it to the power of 2/7 during this calculation. The Temperature Difference Factor is very important for these calculations because it relates the ability of the fluid to transfer heat to the cost of pumping the fluid through the loop. Since the pump power requirements are determined by the temperature difference factor raised to the 7/2 power (see Equation 2), a small difference in the Temperature Difference Factor between two fluids can mean a large difference in pump power requirements.

EXAMPLES 6–8

Figure 5:
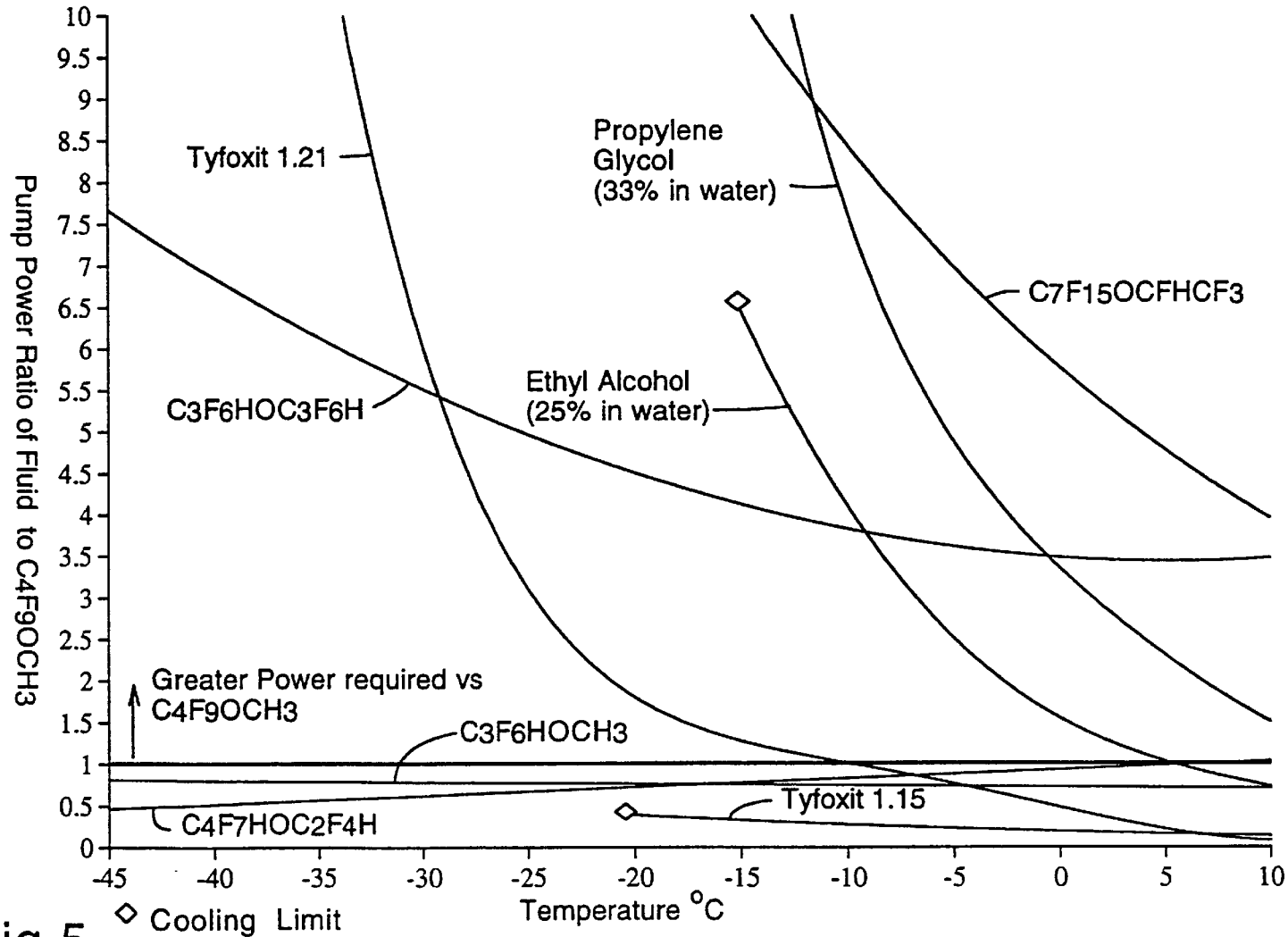
FIGS. 5–7 are graphs depicting the theoretical specific pump power requirements of several conventional secondary cooling fluids compared with $C_4F_9OCH_3$, $C_3F_7OCH_3$ and $C_4F_9OC_2H_5$ respectively.

To illustrate the magnitude of the shift in power requirements brought about by small differences in the Temperature Difference Factor, the Pump Power Ratio ($E_{p1}/E_{p2}$) was determined as a function of temperature in accordance with Equation 2 for Tyfoxit® 1.15, Tyfoxit® 1.21 (inhibited alkali ethanate solutions commercially available from Tyforop Chemie GmbH, Hamburg, Germany), an aqueous solution of 25% by weight ethyl alcohol, and an aqueous solution of 33% by weight of propylene glycol. The reference medium used was $C_4F_9OCH_3$ as shown in FIG. 5. $C_3F_7OCH_3$ as shown in FIG. 6, and $C_4F_9OC_2H_5$ as shown in FIG. 7.

Figure 6:
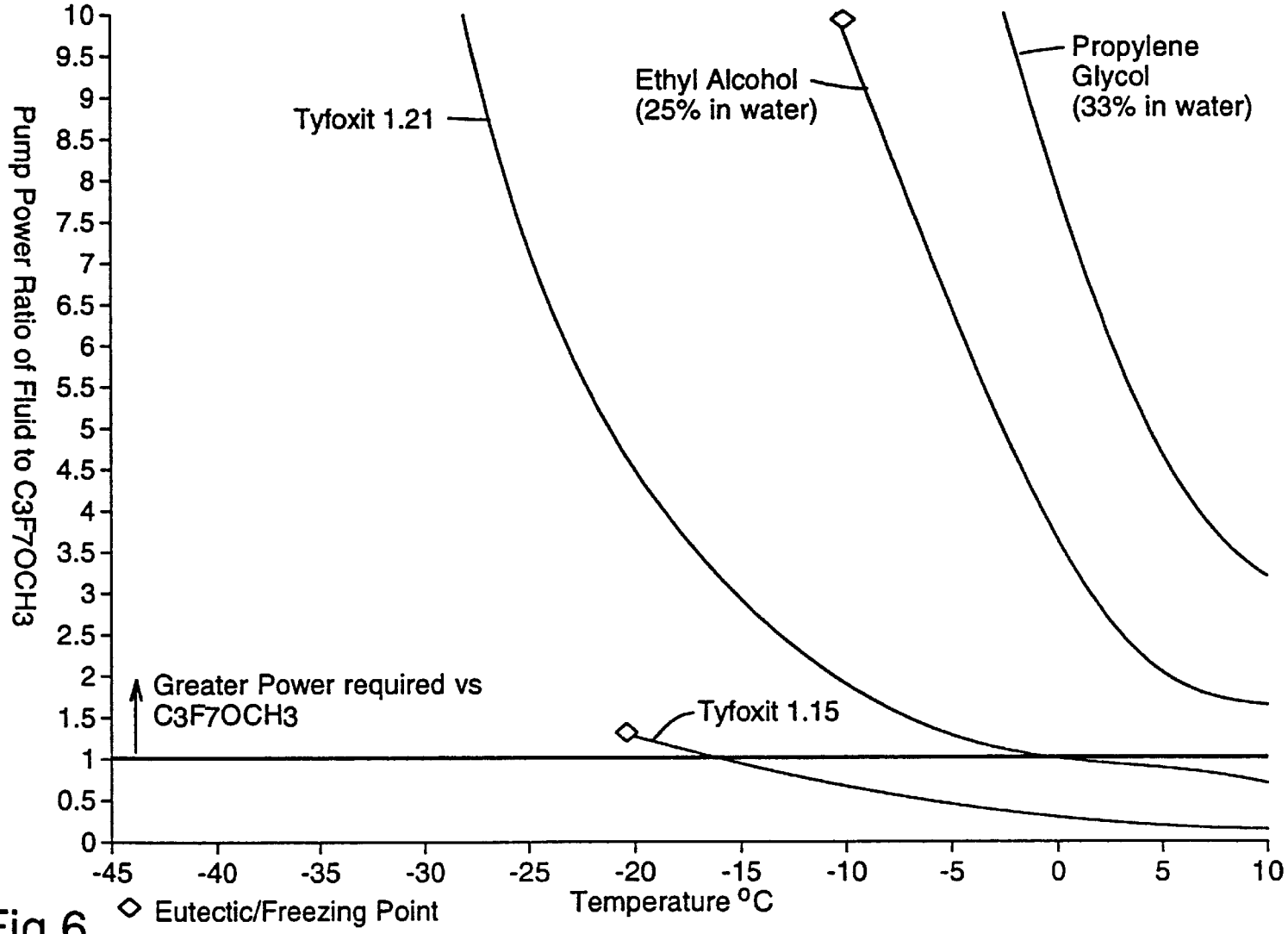
Figure 7:
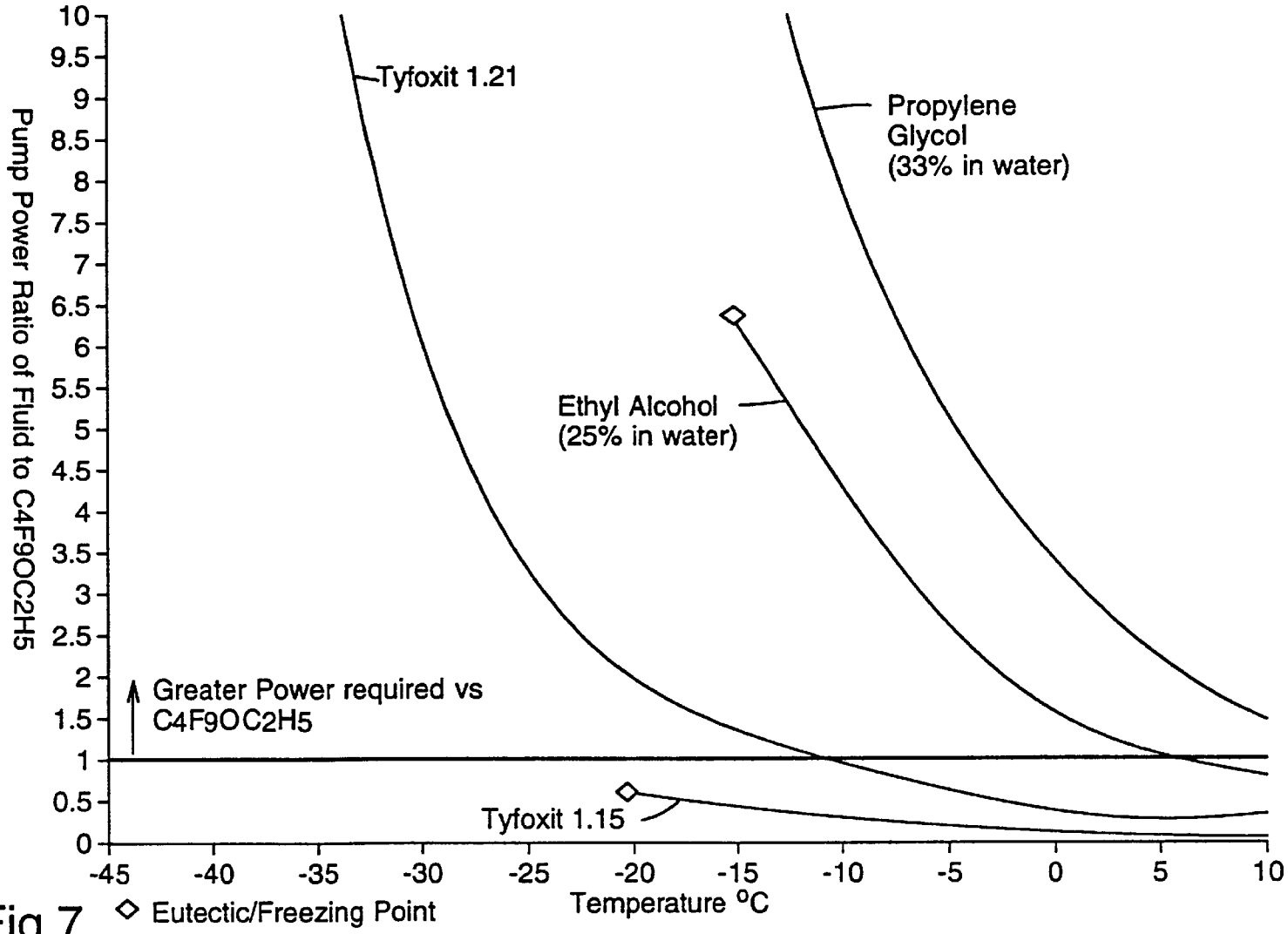

As indicated in FIGS. 5–7, the Pump Power Ratio of all but one of the known heat transfer media surpasses unity at temperatures below about −10° C. Below about −20° C., the freezing point of Tyfoxit® 1.15, $C_4F_9OCH_3$ stands alone. When evaluating the Pump Power Ratio, the compound $C_3F_7OCH_3$ is especially effective as a secondary heat transfer medium.

Water mixed with a freezing point depressant tends to follow the same slope and curve function. Whether the depressant is alcohol, glycol, or salt, the slope and form of the curves tend to very similar. The ability of these fluids to transfer heat drops off rapidly as temperatures approach −20° C. The power required to circulate these water mixtures also climbs at a rapid pace, reducing the feasibility of the secondary heat transfer loop as an economic alternative to direct expansion systems. By contrast, $C_4F_9OCH_3$ has excellent low temperature heat transfer abilities that result in a much reduced pump power requirement for circulation in a secondary system.

EXAMPLE 9

The fluorinated ethers $C_4F_9OCH_3$, $C_4F_9OC_2H_5$, and c-$C_6F_{11}OCH_3$ were tested for flash point by the standard method defined by ASTM D3278-89. Each compound was determined to have no flash point.

The environmental impact of several of the fluorinated ethers of the present invention was assessed by determination of the atmospheric lifetime ($t_{sample}$) and the global warming potential (GWP) of certain compounds, as described in Examples 10–11 below.

EXAMPLE 10

The atmospheric lifetime ($t_{sample}$) of various sample compounds was calculated by the technique described in Y. Tang, Atmospheric Fate of Various Fluorocarbons, M.S. Thesis, Massachusetts Institute of Technology (1993). According to this technique, an ultraviolet (UV) gas cell was charged with a sample compound, a reference compound (either $CH_4$ or $CH_3Cl$), ozone, and water vapor. Hydroxyl radicals were then generated by photolytic decomposition of the ozone in the presence of the water vapor and an inert buffer gas, i.e., helium. As the sample compounds and reference compounds reacted with the hydroxyl radicals in the gas phase, their concentrations were measured by Fourier transform infrared spectroscopy (FTIR). The rate constant for reaction of the sample compound ($k_{sample}$) with hydroxyl radical was measured relative to the rate constant for a reference compound ($k_{ref}$), and the atmospheric lifetime was then calculated using the following formula (where $t_{CH4}$ and $k_{CH4}$ are known values):

$$\tau_{\text{sample}} = \frac{\tau_{\text{CH4}}}{\left(\frac{k_{\text{sample}}}{k_{\text{ref}}}\right)\left(\frac{k_{\text{ref}}}{K_{\text{CH4}}}\right)}$$

The rate constant for each sample compound was measured (using $CH_4$ as the reference compound and again using $CH_3Cl$) at 298K, and the atmospheric lifetime values were calculated and then averaged. The results of these measurements are shown in Table 5. For comparison, the atmospheric lifetime for several hydrofluorocarbons is also shown in Table 5.

Atmospheric lifetime was also estimated from a correlation developed between the highest occupied molecular orbital (HOMO) energy and the known atmospheric lifetimes of hydrofluorocarbons and hydrofluorocarbon ethers, in a manner similar to that described by Cooper et al. in Atmos. Environ. 26A, 7, 1331 (1992). The correlation differed from that found in Cooper et al. in the following respects: the correlation was developed using a larger data set; lifetimes for the correlations were determined by relative hydroxyl reactivity of the sample to $CH_3CCl_3$ at 277K, as described by Zhang et al. in J. Phys. Chem. 98(16), 4312 (1994); HOMO energy was calculated using MOPAC/PM3, a semi-empirical molecular orbital package; and the number of hydrogen atoms present in the sample was included in the correlation. The results are reported in Table 5.

EXAMPLE 11

Global warming potential (GWP) was determined for some of the heat transfer media of the present invention using the values for atmospheric lifetime calculated in Example 7 and experimentally determined infrared absorbance data integrated over the spectral region of interest, typically 500 to 2500 $cm^{-1}$. The calculations were based on the definition of GWP set forth by the Intergovernmental Panel in Climate Change in Climate Change: The IPCC Scientific Assessment, Cambridge University Press (1990). According to the Panel, GWP is the integrated potential warming due to the release of 1 kilogram of sample compound relative to the warming due to 1 kilogram of $CO_2$ over a specified integration time horizon (ITH) using the following equation:

$$GWP_{sample} = \frac{\int_0^{ITH} \Delta T_x C_{0x} e^{-t/\tau x}\, dt}{\int_0^{ITH} \Delta T_{CO_2} C_{CO_2}\, dt}$$

where DT is the calculated change in temperature at the earth's surface due to the presence of a particular compound in the atmosphere [calculated using a spreadsheet model (using parameters described by Fisher et al. in Nature 344, 513 (1990)) derived from Atmospheric and Environmental Research, Inc.'s more complete one-dimensional radiative-convective model (described by Wang et al. in J. Atmos. Sci. 38, 1167 (1981) and J. Geophys. Res. 90, 12971 (1985)], C is the atmospheric concentration of the compound, t is the atmospheric lifetime of the compound (the calculated value described above), and x designates the compound of interest. Upon integration, the formula is as follows:

wherein $A_1$=0.30036, $A_2$=0.34278, $A_2$=0.35686, $t_1$=6.993, $t_2$=71.108, and $t_3$=815.73 in the Siegenthaler (1983) coupled ocean-atmosphere $CO_2$ model. The results of these calculations are set forth in Table 5.

$$GWP_{sample} = \frac{\Delta T_x C_{0x\tau x}[1 - e^{-ITH/\alpha}]}{\Delta T_{CO_2}(1.3\times 10^{-10})[A_{1\tau 1}(1 - e^{-ITH/\tau 1}) + A_{2\tau 2}(1 - e^{-ITH/\tau 2}) + A_{3\tau 3}(1 - e^{-ITH/\tau 3})]}$$

TABLE 5

| Compound | Estimated Atmospheric Lifetime (years) | Global Warming Atmospheric Lifetime (years) | Potential (100 year ITH) |
|---|---|---|---|
| $CF_3$—$CH_3$ | 62.2 | | |
| $CF_3$—O—$CH_3$ | 1.6 | | |
| $C_2H_5$—$CH_3$ | 12.6 | | |
| $C_2H_5$—O—$CH_3$ | 1.6 | | |
| $C_3H_7$—$CH_3$ | 9.6 | | |
| $C_3H_7$—O—$CH_3$ | 1.9 | | |
| $C_4H_9$—$CH_3$ | 7.0 | | |
| $C_4H_9$—O—$CH_3$ | 1.9 | 5.5 | 330 |
| $C_4H_9$—$C_2H_5$ | 2.0 | | |
| $C_4H_9$—O—$C_2H_5$ | 0.5 | 1.2 | 70 |
| c-$C_6F_{11}$—$CH_3$ | 13.7 | | |
| c-$C_6F_{11}$—O—$CH_3$ | 1.8 | 3.8 | 170 |
| $CF_3CFHCFHCF_2C_3$ | 23* | | 1000 |

*A. M. Schmoltner et al, J. Phys. Chem 97 8976 (1993)

As indicated by the data in Table 5, each of the fluorinated ethers of the present invention has an unexpectedly lower atmospheric lifetime than the corresponding hydrofluorocarbon, i.e., the hydrofluorocarbon having the same carbon number. The fluorinated ethers of the present invention are thus more environmentally acceptable than the hydrofluorocarbons (which have previously been proposed as chlorofluorocarbon replacements).

The physical properties of $C_4F_9OCH_3$, determined in accordance with the above described methods, are set forth in Table 6.

TABLE 6

| Physical Properties of $C_4F_9OCH$ | |
|---|---|
| Boiling Point (° C.) | 60 |
| Freezing Point (° C.) | −135 |
| Flash Point (° C.) | None |
| Solubility for water (ppm) | 95 |
| Solubility in water (ppm) | <10 |

Thermal Transport Properties of $C_4F_9OCH_3$

| | @ 0° C. | @ −40° C. |
|---|---|---|
| Density (gm/ml) | 1.54 | 1.63 |
| Specific Heat (J/Kg ° C.) | 1133 | 1053 |
| Viscosity (cSt) | .60 | 1.07 |
| Thermal Conductivity (W/m ° C.) | .074 | .082 |

Environmental Properties of $C_4F_9OCH_3$

| | | |
|---|---|---|
| Ozone Depletion Potential (ODP) | o | (CPC11 = 1) |
| Volatile Organic Compound (VOC) | No | |
| Atmospheric Lifetime | 4.0 years | |
| GWP (IPCC 1994) | 480 | ($CO_2$ = 1, 100th year) |
| HGWP | 0.09 | (CPC11 = 1) |

EXAMPLE 12

The following example illustrates the effectiveness of hydrofluoroethers over other refrigerants in secondary refrigeration systems.

A secondary refrigeration systemw as needed for large events at stadiums and arenas. In order to meet customer demands, the system has to be capable of chilling several cases of plastic bottles of soda from room temperature (85° F.) to serving temperature (34° F.) in less than 15 minutes. The proposed system was rejected as being unfeasible by several refrigeration companies in the U.S. and in Europe.

In one design proposed by a refrigeration manufacturer, a traditional refrigeration system was used to cool a large reservoir of liquid. The chilled liquid was then pumped from the reservoir to a coil in a blast cooler. Air in the cooler was then circulated at high velocity to remove thermal energy from the bottles and transfer it to the cooled coil. In this design, the large reservoir of liquid served as a "thermal flywheel" capable of absorbing a large amount of energy. Upon completion of the blast cycle, the thermal energy is removed from the reservoir at a lower rate with the refrigeration system to prepare for another cycle.

An initial test was performed using a propylene glycol/water mixture (a common secondary refrigerant) in this system. Using the propylene glycol mixture, it took 75 minutes to achieve the required drop in temperature from 85° F. to 34° F., well above the 15 minute period specified.

A second test was performed which was identical to the initial test, except that $C_4F_9OCH_3$ was substituted for the propylene glycol/water mixture. This time, the system required only 12 minutes to achieve the required temperature drop.

The above description is intended to be illustrative of the present invention, and is not intended to be limiting. Therefore, the scope of the invention should be construed solely by reference to the appended claims.

What is claimed is:

1. A refrigeration system, comprising:

a display case for displaying refrigerated goods;

[first] *second* heat transfer means for transferring heat from said display case to a [first] *second* heat transfer medium; and

[second] *first* heat transfer means for transferring heat from said [first] *second* heat transfer medium to a [second] *first* heat transfer medium; wherein said [second] *first* heat transfer means cools said [first] *second* heat transfer medium to less than about −15° C., and wherein said [first] *second* heat transfer medium comprises an ether of the formula $$R_1—O—R_2$$

wherein $R_1$ and $R_2$ are alkyl groups, and wherein at least one of $R_1$ and $R_2$ is at least partially fluorinated.

2. The refrigeration system of claim 1, wherein $R_1$ is a perfluorinated alkyl group.

3. The refrigeration system of claim 1, wherein $R_1$ and $R_2$ are short chain alkyl groups, and wherein $R_1$ is perfluorinated.

4. The refrigeration system of claim 1, wherein said ether is selected from the group consisting of $C_3F_7OCH_3$, $C_4F_9OCH_3$, and $C_4F_9OC_2H_5$.

5. The refrigeration system of claim 1, wherein said [second] *first* heat transfer medium comprises ammonia.

6. The refrigeration system of claim 1, further comprising:

accelerating means for accelerating the rate at which heat is transferred from said heat source to said [first] *second* heat transfer medium.

7. The refrigeration system of claim 6, wherein said accelerating means induces a turbulent flow in the atmosphere between said heat source and said [first] *second* heat transfer means.

8. The refrigeration system of claim 7, wherein said accelerating means comprises a high velocity fan.

9. The refrigeration system of claim 1, wherein said first heat transfer medium and said second heat transfer medium are disposed in separate refrigeration loops.

10. The refrigeration system of claim 1, wherein said [first] *second* heat transfer means comprises a refrigeration coil disposed in said display case.

11. A refrigeration system, comprising:

a display case for displaying refrigerated goods;

a first refrigeration loop with a first refrigerant disposed therein;

a second refrigeration loop with a first refrigerant disposed therein;

a refrigeration coil, in open communication with said second refrigeration loop, for transferring heat from said display case to said second refrigerant; and a heat exchanger for transferring heat from said second refrigerant to said first refrigerant;

wherein said [first] *second* refrigerant comprises a fluorinated ether.

12. The refrigeration system of claim 11, wherein said refrigeration coil is disposed in said display case.

13. The refrigeration system of claim 11, further comprising:

a compressor for transferring heat from said first refrigerant to the ambient atmosphere.

14. In combination with the refrigeration system of claim 11, a building defining an interior space and an exterior space, wherein said display case is disposed in said interior space and said compressor is disposed in said exterior space.

15. The combination of claim 14, wherein said first refrigeration loop is disposed primarily in said exterior space and said second refrigeration loop is disposed primarily in said interior space.

16. The refrigeration system of claim 11, wherein said [first] *second* refrigerant is cooled to less than about −15° C.

17. The refrigeration system of claim 11, wherein said [first] *second* refrigerant is cooled to less than about −25° C.

18. The refrigeration system of claim 11, wherein said ether is selected from the group consisting of $C_3F_7OCH_3$, $C_4F_9OCH_3$, and $C_4F_9OC_2H_5$.

19. The refrigeration system of claim 11, wherein said first refrigerant comprises ammonia.

20. The combination of claim 11, wherein said first refrigerant comprises ammonia, wherein said fluorinated ether is selected from the group consisting of $C_3F_7OCH_3$, $C_4F_9OCH_3$, and $C_4F_9OC_2H_5$, and wherein said second refrigerant is cooled to less than about −15° C.

21. The combination of claim 20, wherein said second refrigerant is cooled to less than about −25° C.

* * * * *

UNITED STATES PATENT AND TRADEMARK OFFICE

CERTIFICATE OF CORRECTION

PATENT NO. : RE 37,054 E
DATED : February 20, 2001
INVENTOR(S) : Sherwood, Gregory J.

It is certified that error appears in the above-identified patent and that said Letters Patent is hereby corrected as shown below:

Column 5,
Line 57, delete "$F_\alpha=0.023\cdot\lambda^{(2/3)})\cdot(p-c_p)^{1/3}\cdot v^{-1/2}$" and insert in place thereof -- $F_\alpha=0.023\cdot\lambda^{(2/3)}\cdot(p-c_p)^{1/3}\cdot v^{-1/2}$ --.

Column 7,
Line 17, delete "$C_4\ H_9\ OC_2\ H_5$" and insert in place thereof -- $C_4\ F_9\ OC_2\ H_5$ --.

Column 12,
Line 66, delete "systemw as" and insert in place thereof -- system was --.

Signed and Sealed this

Seventh Day of May, 2002

*Attest:*

*Attesting Officer*

JAMES E. ROGAN
*Director of the United States Patent and Trademark Office*